J. W. LAWSON.
GEM SETTING.
APPLICATION FILED MAR. 23, 1909.

983,295.

Patented Feb. 7, 1911.

WITNESSES:

INVENTOR:
James W. Lawson
By Howard H. Lamprey
Attorney.

UNITED STATES PATENT OFFICE.

JAMES W. LAWSON, OF PROVIDENCE, RHODE ISLAND.

GEM-SETTING.

983,295.　　　　Specification of Letters Patent.　　Patented Feb. 7, 1911.

Application filed March 23, 1909. Serial No. 485,266.

*To all whom it may concern:*

Be it known that I, JAMES W. LAWSON, a citizen of the United States of America, residing at Providence, in the county of Providence and State of Rhode Island, have invented certain new and useful Improvements in Gem-Settings, of which the following is a specification, reference being had therein to the accompanying drawing.

Similar letters of reference indicate corresponding parts in all the figures.

My invention relates to an improvement in jewel settings and has for its object the making of various connections and ornaments integral with the box-setting or gem-setting now in common use, and comprises the novel construction and combination of the several parts as hereinafter described and particularly set forth in the claims.

Figure 1:
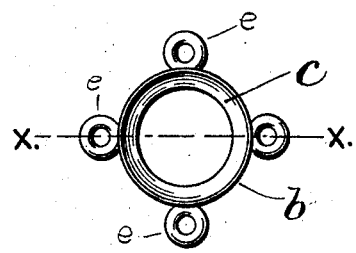
Figure 2:
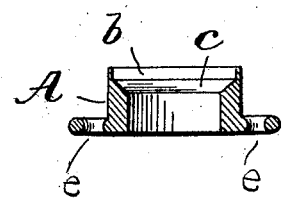
Figure 3:
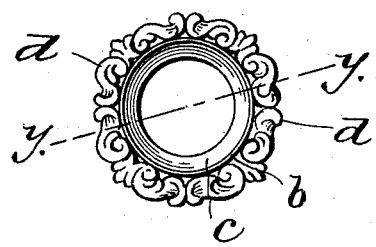
Figure 4:
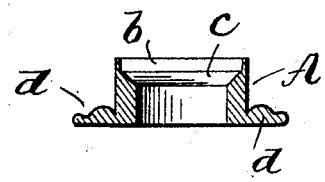
Figure 5:
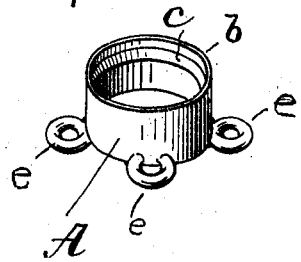
Figure 6:
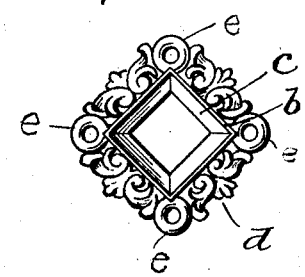

Figure 1 is a top plan view of a box-setting having rings integral therewith. Fig. 2 is cross-sectional view upon line X—X of Fig. 1. Fig. 3 is a top plan view of a box-setting with ornamental structures integral therewith. Fig. 4 is a cross-sectional view taken upon line Y—Y of Fig. 3. Fig. 5 is a perspective view of the box-setting shown in Figs. 1 and 2. Fig. 6 is a top plan view of a square form of box-setting having both rings and ornamental structures integral therewith.

In the drawings A represents the body portion of a gem-setting which may be circular, oval, rectangular, or of any desired shape or form. A has a flange b, an inner shoulder, bevel or seat c and the scrolls or other ornamental structures d, d, and the rings, bars or other connections and attachments e e. The flange b extends in a plane parallel with the surfaces of said body portion and may so extend as to have its outer surface peripherally continuous with the outer surface of said body portion and to form the internal shoulder c as shown; or said flange may be so constructed as to have its external diameter less than the external diameter of said body portion and its internal diameter greater than the internal diameter of said body portion thus forming both an internal and external annular shoulder. The shoulder or seat c may be beveled or square, or of any configuration desired to properly receive and hold the girdle of the gem. The parts d, d are integral with said body portion with the orifices therein pierced out and said parts may be of any size, design or shape and be constructed and adapted to any purpose desired, such for instance as portions thereof forming the bars and eyelets e, e, when so pierced.

Heretofore in the use of the form of box-setting shown in the drawings whenever any ornamental structures, attachments or connections of any kind or nature have been used, such as correspond to the parts d—d as ornamental structures and e—e as rings, eyelets and other connections, they have been swaged or soldered to the form of box-setting shown. The soldering anneals and weakens the adjacent metals so that by reason thereof and also through faulty swaging said ornamental structures, attachments, and connections are often insecure and results in the loss of valuable ornaments and gems or in the article of jewelry being rendered useless and put away lest the valuable gem which the gem-setting holds should be lost. And in the case of the cheaper lines of goods the cost of the time and labor necessary to assemble the said ornamental structures, attachments and connections and to solder them is so great that it is prohibitive for many articles. In my improved gem-setting, said ornamental structures, attachments and connections or securing members are struck up integrally with said body portion from the same piece of stock and so can be made as strongly as desired and at the same time at a great saving of time and labor and dispensing entirely with said swaging and soldering. Moreover I strike up my improved gem-setting together with said parts d d and e e at once in the oval, square, circular or any shape desired, whereas the box-setting shown is made only in the round and so to get any other shape it must afterward be taken and swaged into the desired shape.

My improved gem-setting can be struck up with an open or closed back as desired.

I claim as a novel and useful invention and desire to secure by Letters Patent—

1. The improved gem-setting herein described consisting of a body portion of uniform thickness, a flange of less thickness extending integrally from one end of said body portion parallel with the axis of, and having its outer surface in direct even and regular continuation of the outer surface of said body portion, and a shoulder extending from the inner base of said flange to the inner surface of said body portion and ornamental structures and rings extending integrally from the other end of said body portion and from the outer surface thereof and radially from and substantially at right angles to said axis, substantially as specified.

2. The improved gem-setting herein described consisting of a body portion of uniform thickness, a flange of less thickness extending integrally from one end of said body portion parallel with the axis and having its outer periphery everywhere in alinement with the outer periphery of said body portion and a shoulder extending from the inner base of said flange to the inner surface of said body portion and connections and ornamental structures extending integrally from the other end of said body portion and from the outer surface thereof and radially therefrom and substantaily at right angles to said axis, as and for the purpose specified.

3. The improved gem-setting herein described consisting of a body portion having an internal seat adapted to receive a gem, an integral flange extending from the top outline of said seat, and ornamental structures extending integrally from the base of said body portion and from the outer surface thereof and in a plane substantially parallel to the plane pasing through said seat, substantially as and for the purpose set forth.

In testimony whereof I affix my signature in presence of two witnesses.

JAMES W. LAWSON.

Witnesses:
BENJAMIN L. DENNIS,
HOWARD A. LAMPREY.